3,236,929
INJECTION MOLDING
Julius A. Jupa, Union, and Francis J. Rielly, Chatham, N.J., assignors to Celanese Corporation of America, New York, N.Y., a corporation of Delaware
No Drawing. Filed Aug. 9, 1961, Ser. No. 130,244
14 Claims. (Cl. 264—328)

This invention relates to injection molding of molding powder especially adapted to produce injection-molded articles of high-impact strength.

Oxymethylene polymers having successively recurring —$CH_2O$— units may be made of sufficiently high molecular weight, stability and toughness to be useful in the preparation of molded articles.

Oxymethylene copolymers containing oxyalkylene groups with adjacent carbon atoms are particularly useful since they are more readily moldable and have better thermal stability than oxymethylene homopolymers.

Oxymethylene copolymers of this type may be prepared by copolymerizing trioxane with from 0.1 to 15 mol percent of a cyclic ether having adjacent carbon atoms. Such copolymers are described in U.S. Patent 3,027,352 of Walling, Brown and Bartz. The preferred copolymers are those made up of oxymethylene and oxyethylene groups, such as copolymers of trioxane with dioxolane or with ethylene oxide.

Injection-molded articles may be prepared from such copolymers by heating a molding powder comprising pellets of the copolymer in a preheating zone until the polymer is transformed to a plastic state and thereafter forcing the plastic polymer through a nozzle into a closed mold wherein the polymer is cooled to solid state.

In accordance with the present invention it has been found that the impact strength of the injection-molded article is improved if the polymer pellets in the preheating zone have a surface layer of a normally solid lubricant. The preferred lubricants have a melting point of at least 110° C.

In a preferred embodiment the oxymethylene copolymer is a copolymer having a melt index between about 1.0 and 30.0 dg./min., the melt index being determined in accordance with ASTM D1238–57T Condition E test. Copolymers of controlled molecular weight having melt indices within the above range may be prepared by copolymerizing trioxane and the cyclic ether with the higher oxyalkylene groups in the presence of from 0.1 to 3.0 moles per 1000 moles of monomers of a chain transfer agent, such as methylal, formic acid, acetic anhydride, methanol or acetal. Copolymerization in this manner is described in application Serial No. 89,371, filed February 15, 1961, by Schnizer, Heinz and Seddon, commonly assigned to the assignee of the present application.

Usually one or more thermal stabilizers is incorporated into the polymer pellets in order to reduce degradation during molding.

The proportion of stabilizer incorporated depends upon the specific stabilizer used. A proportion between about 0.05 and 10 weight percent (based on the weight of polymer) has been found to be suitable for most stabilizers.

One suitable stabilizer system is a combination of an antioxidant ingredient such as phenolic antioxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene-bis-(4-methyl-6-tertiary butyl phenol) and 4,4'-butylidene-bis-(6-tertiary butyl-3-methyl phenol). Suitable phenolic stabilizers other than alkylene bisphenols include 2,6-ditertiary butyl-4-methyl phenol octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having amidine groups, cycloaliphatic amine compounds and aliphatic acylureas. Suitable scission inhibitors as well as suitable antioxidants and proportions are disclosed in U.S. Patent No. 3,152,101, issued to Dolce on October 6, 1964; U.S. Patent No. 3,144,431, issued to Dolce, Berardinelli and Hudgin on August 11, 1964; application S. No. 838,427, filed by Berardinelli on September 8, 1959; application S. No. 838,832, filed by Dolce and Hudgin on September 9, 1959; application S. No. 841,690, filed by Kray and Dolce on September 23, 1959; application S. No. 851,560, filed by Berardinelli, Kray and Dolce on November 9, 1959; U.S. Patent No. 3,133,896, issued to Dolce and Berardinelli on May 19, 1964; and U.S. Patent No. 3,156,-669, issued to Kray and Dolce on November 10, 1964. The disclosures of the above-mentioned applications commonly assigned to the assignee of the present application are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the stabilizers is by blending a dry solid stabilizer into the plastic polymer while the latter is being kneaded as on heated rolls, through an extruder on a Banbury mixer.

The copolymer stabilizer mixture may be pelletized by chopping the extrudate of an extrusion blender or by scoring and cutting a rolled sheet, or by grinding roll sheet stock. The pellets used in the injection molding may be in the form of cubes, spheroids, cylinders, or lenticular, or irregular chips, and are usually between about 32 and about 2 mesh in size. Preferably the pellets are between about 16 and about 4 mesh in size.

The preferred lubricants are the water-insoluble soaps of high melting point and preferably water insoluble metal salts of aliphatic carboxylic acids having at least 12 carbon atoms, and melting at a temperature in excess of 110° C. Suitable soaps include zinc stearate, aluminum palmitate, magnesium stearate, lithium stearate, and calcium stearate.

In addition to the soaps, other lubricants which may be used include stearic acid, waxes such as ceresin, and long-chain aliphatic amides such as stearamide, oleamide, palmitamide, lauramide, and ethylene-bis-stearamide.

The water-insoluble soaps are preferred because their lubricating action is most effective on a weight basis.

The lubricant may be coated on the pellets by tumbling or otherwise mixing the pellets with powdered lubricant. Another suitable method is to wet the pellets with a liquid suspension of the lubricant and then drain and dry the pellets.

Lubricant coating has been proposed with respect to pellets of thermoplastic materials which are difficult to mold. The oxymethylene copolymers used in accordance with this invention are quite easy to mold by injection, and require neither extremely high temperatures nor extremely high pressures. Since the usual reason for surface lubrication is absent it is quite surprising that surface lubrication in the injection molding of oxymethylene copolymers produces molded objects of enhanced impact strength.

The "impact strength" referred to is the practical impact strength measured by dropping a standard steel weight onto a standard molded box from increasing heights until the box breaks.

The box is a molded box 10" x 4" x 1¾" and is open on a 10" x 4" side. The walls are 0.065" thick. The weight is a 3-pound rod about 6" long and of about 1½" diameter. At its lower end it tapers to an impact area equivalent to the area of a ½" circle. The test is run at room temperature and the box is placed with its open face downward on a firm surface. The weight is initially dropped onto the center of the top face of the box from a height of 1 foot and successively from heights increased by 6" until breakage occurs. It has been found that by the use of this invention the practical impact strength is increased from about 10–15 foot-pounds to about 18–23 foot-pounds.

The injection-molding process is carried out in a conventional injection-molding apparatus having a preheating cylinder, a plunger, a torpedo, a nozzle and a mold including a sprue, runners, gates, and mold cavities. Cylinder temperatures are usually between about 350° F. and about 480° F., and molding pressures are usually between about 10,000 and about 20,000 p.s.i. Cycle times are usually between about 30 and about 110 seconds.

*Example*

Cylindrical pellets (⅛" x ⅛") of a copolymer of trioxane with 2.5 weight percent of ethylene oxide, having a melt index of 9, and containing as stabilizers 0.1 weight percent of cyanogenamidine and 0.5 weight percent of 2,2'-methylene-bis(4-methyl-6 tertiary butyl phenol), were coated with 0.05 weight percent of zinc stearate by tumbling the pellets in a drum with the powdered lubricant.

Test boxes were injection-molded from the coated pellets in a 4-ounce injection-molding machine having a disc across the nozzle with an orifice of 100 mil diameter. The temperature of the material in the cylinder was 470° F. and the pressure on the material was 20,000 p.s.i. The injection cycle time was 45 seconds, and the mold temperature was 200° F.

The practical impact strength of the box (measured as described above) was 22.5 foot-pounds.

For comparison purposes, another test box was molded from the same resin and under the same conditions, except that the resin pellets were not coated with zinc stearate. The practical impact strength of this box was 15 foot-pounds.

It is to be understood that the foregoing detailed description is given merely by way of illustration and that many variations may be made therein without departing from the spirit of our invention.

Having described our invention, what we desire to secure by Letters Patent is:

1. In the injection molding of oxymethylene copolymers wherein pellets of a copolymer having successively recurring oxymethylene groups and having oxyalkylene groups with adjacent carbon atoms are heated in a preheating zone to the plastic state and thereafter forced through a nozzle into a closed mold, the improvement which comprises applying to said pellets a surface layer of a water-insoluble soap.

2. The molding process of claim 1 wherein said soap is zinc stearate.

3. The molding process of claim 1 wherein said soap is aluminum palmitate.

4. The molding process of claim 1 wherein said soap is magnesium stearate.

5. In a process for injection molding oxymethylene copolymer pellets of between about 2 and 32 mesh, said copolymer having successively recurring oxymethylene groups and from 0.1 to 15.0 mol percent of oxyethylene groups, and having a melt index between about 1.0 and 30.0 dg./min., comprising heating said copolymer in a preheating zone to the plastic state and thereafter forcing said copolymer through a nozzle into a closed mold, the improvement which comprises applying to said pellets a surface layer of a water-insoluble metal salt of an aliphatic carboxylic acid having at least 12 carbon atoms and a melting point of at least 110° C., whereby the impact strength of said copolymer is increased at least 3 foot-pounds.

6. The process of claim 5, wherein said copolymer pellets contain between about 0.05 and 10 weight percent, based upon the copolymer, of a mixture of an alkylene bisphenol having from 1 to 4 carbon atoms in the alkylene group and having from zero to 2 alkyl substituents on each benzene ring, each alkyl substituent having from 1 to 4 carbon atoms, and at least one amidine compound.

7. The process of claim 5, wherein said water-insoluble salt is zinc stearate, said alkylene bisphenol is 2,2'-methylene-bis(4-methyl-6-tertiary butyl phenol), and said amidine compound is selected from the group consisting of cyanoguanidine and melamine.

8. In a process for forming shaped articles from oxymethylene copolymer having recurring oxymethylene units and recurring oxyalkylene units having at least two carbon atoms, comprising heating said copolymer to a substantially plastic state and advancing the thus formed semi-molten mass of said copolymer into contact with a shaping surface, the improvement which comprises applying to the copolymer feed stock in unplasticized state a surface layer of a lubricant selected from the group consisting of water insoluble soaps, higher carboxylic acids, hydrocarbon waxes and long chain aliphatic amides.

9. The process of claim 8, wherein said lubricant is normally solid and exhibits a melting point of at least 110° C.

10. The process of claim 8, wherein said lubricant acts to increase the impact strength of said shaped article by at least 3 ft.-lbs.

11. In a process for forming shaped articles from oxymethylene copolymer having recurring oxymethylene units and recurring oxyalkylene units having at least two carbon atoms, comprising heating said copolymer to a substantially plastic state and advancing the thus formed semi-molten mass of said copolymer into contact with a shaping surface, the improvement which comprises applying to the copolymer feed stock in unplasticized state a surface layer of a long chain aliphatic amide.

12. The process of claim 11, wherein said amide is stearamide.

13. The process of claim 11, wherein said amide is ethylene-bis-stearamide.

14. In a process for injection molding oxymethylene copolymer pellets of between about 2 and 32 mesh,
    said copolymer having successively recurring oxymethylene groups and from 0.1 to 15.0 mol percent of oxymethylene groups,
    exhibiting a melt index between about 1.0 and 30.0 dg./min., and
    containing between about 0.05 and 10 weight percent, based upon the copolymer, of a mixture of
        an alkylene bisphenol having from 1 to 4 carbon atoms in the alkylene group, and having from 0 to 2 alkyl substituents on each benzene ring, each alkyl substituent having from 1 to 4 carbon atoms, and
        at least one amidine compound,
    comprising heating said copolymer in a preheating zone to the plastic state and thereafter forcing said copolymer through a nozzle into a closed mold,
    the improvement which comprises applying to said pellets a surface layer of ethylene-bis-stearamide.

(References on following page)

References Cited by the Examiner

UNITED STATES PATENTS

| | | | |
|---|---|---|---|
| 2,109,592 | 3/1938 | Macht et al. | 18—55 |
| 2,109,593 | 3/1938 | Macht | 18—55 |
| 2,217,163 | 10/1940 | Fletcher | 18—55 |
| 2,309,729 | 2/1943 | Gordon | 18—55 |
| 2,532,245 | 11/1950 | Serdynsky | 18—55 |
| 2,839,422 | 6/1958 | Beyer et al. | 18—47 |
| 2,948,698 | 8/1960 | Cocci | 260—32.6 |
| 2,956,309 | 10/1960 | Herbst | 18—55 |
| 2,991,265 | 7/1961 | Clark | 260—32.6 |

ALEXANDER H. BRODMERKEL, *Primary Examiner.*

WILLIAM J. STEPHENSON, *Examiner.*